United States Patent [19]

Crawford et al.

[11] Patent Number: 5,355,208
[45] Date of Patent: Oct. 11, 1994

[54] DISTRIBUTED FIBER OPTIC SENSOR FOR LOCATING AND IDENTIFYING REMOTE DISTURBANCES

[75] Inventors: Brian B. Crawford; Robert J. Prenovost, both of Huntsville; Jimmy L. Reil, Hazelgreen; Jeff C. Robinson, Faulkville, all of Ala.

[73] Assignee: Mason & Hanger National, Inc., Huntsville, Ala.

[21] Appl. No.: 903,358

[22] Filed: Jun. 24, 1992

[51] Int. Cl.⁵ ............................................. G01B 9/02
[52] U.S. Cl. ................................ 356/35.5; 356/345; 250/227.19
[58] Field of Search ................... 356/345, 350, 35.5; 250/227.19, 227.27

[56] References Cited

U.S. PATENT DOCUMENTS

| | | | |
|---|---|---|---|
| 4,375,680 | 3/1983 | Cahill et al. | 356/345 |
| 4,773,758 | 9/1988 | Shaw | 356/345 |
| 4,787,741 | 11/1988 | Udd et al. | 356/35.5 |
| 4,853,534 | 8/1989 | Dakin | 250/227 |
| 4,885,462 | 12/1989 | Dakin | 250/227 |
| 4,898,468 | 2/1990 | Udd | 356/345 |
| 4,904,050 | 2/1990 | Dunn et al. | 350/96.29 |
| 4,931,771 | 6/1990 | Kahn | 340/556 |
| 5,012,088 | 4/1991 | Cole et al. | 250/227.19 |

*Primary Examiner*—Samuel A. Turner
*Attorney, Agent, or Firm*—Roy P. Collins

[57] ABSTRACT

A distributed fiber optic sensing system for detecting mechanical, acoustic, or ultrasonic disturbances is disclosed. This system is optimized for use as an intrusion detection system in security applications. Light is launched into opposite ends of a sensing fiber loop such that two beams circulate through the loop in opposite directions and then recombine to produce an interference pattern on a photoelectric detector. Disturbances of the sensing fiber loop produce corresponding changes in the interference pattern and thereby the signal level at the detector. The changes in the electrical signal from the detector are interpreted to provide alarms when the sensing fiber loop is impinged upon by intrusive disturbances, and to provide location of disturbances along the loop. Means are incorporated to decode uniquely coded sonic or ultrasonic signals from personal transmitters borne by authorized personnel approaching the sensing fiber loop. A remotely activated system disturber is affixed to the sensing fiber loop which, when activated by an operator, provides positive confirmation of sensing loop continuity and system operability.

10 Claims, 4 Drawing Sheets

DISTRIBUTED FIBER OPTIC SENSOR FOR LOCATING AND IDENTIFYING REMOTE DISTURBANCES

BACKGROUND OF THE INVENTION

1. Field of the Invention

This invention relates to fiber optic systems and methods for detection and location of acoustic, ultrasonic, mechanical, and other disturbances. In particular, it relates to a system for detecting, locating, and identifying an intrusion upon a distributed fiber optic sensor.

2. Description of the Related Art

Distributed optical fiber sensing systems based on the Sagnac interferometer and the Mach-Zehnder interferometers have been developed. These systems depend on the interferometric detection of phase differences between two optical signals whose relative phases have been shifted by changes in the optical properties of their respective paths caused by the acoustical, mechanical, or other measure and of interest. The change in optical property of the fiber path may be in the form of elongation, change in index of refraction, change in birefringence, or a combination of these or related effects.

With modern low loss fibers and solid state laser diode sources, it has become possible to develop systems having single sensing loops up to several tens of kilometers in length. In one field of application, these fiber sensing loops can, for example, be placed under carpets, imbedded in walls, under roads, or under turf. In such installations the sensors can be effective to detect the intrusion of personnel, vehicles, animals, etc. into a protected area of interest. Another application of interest is to use one or more of the fibers within a telecommunications or power cable as the distributed sensor element to provide information as to contact with or intrusion into the cable anywhere along its length. Such an arrangement would be most valuable for protection of the cable facilities of power or telephone companies against unauthorized intrusion or tampering. When deployed in this manner, the sensor can detect direct contact, mechanical pressure, or acoustic signals. By virtue of the interferometric phase sensing, such sensors have been found to have very high useable sensitivity over great lengths.

While these distributed sensor systems are valuable in detecting events over large areas, they have several limitations. In particular, there are no convenient and economical means for determining the location of an event along the extensive sensing loop. A simple approach to this problem has been the breaking of a larger perimeter protecting loop into a number of smaller loops, each protecting a more limited zone. This however defeats a major cost advantage of long sensors in that separate sources, couplers, detectors, and connections are required for each zone. Moreover, such segmenting is not convenient or economic in long distributed systems such as intercity telephone or power cables. Other means have been devised to overcome this limitation by complex means of signal processing as described by Eric Udd in U.S. Pat. No. 4,976,507, "Sagnac Distributed Sensor". There he describes a systems wherein the severity and location of a time varying disturbance are determined along a fiber by operating a Sagnac interferometer either simultaneously or sequentially in two distinct modes. In the first mode the interferometer is operated where the counterpropagating light signals in the Sagnac loop operate at the same wavelength such that when an event impinges on the fiber, the relative phase shift generated between the counterpropagating light beams will depend on the location of the event around the loop and the severity of the event. In the second mode, an optical frequency shifting element is activated in one side of the sensing loop near the source. The first light beam which propagates from the source through the short side of the loop near the frequency shifter is shifted up in frequency by a slight amount before it passes out over the active sensing portion of the loop. The other counterpropagating beam passes through the distributed sensing loop first, and is then shifted up in frequency by the same amount just before passing back into the common source. This has the effect that the two beams are at slightly different frequencies at any point out on the active sensing loop, but are at the same higher frequency when they recombine at the detector. According to the disclosure, in this mode a disturbance to the fiber will cause a relative phase shift to the two beams of different frequency and the magnitude of the phase shift is determined by the severity of the disturbance. However, the magnitude of the phase shift is not affected by the position of the disturbance along the loop. Through complex processing of the information from the two modes, the information as to location and severity of disturbance may be separated. This method has the disadvantage of requiring an expensive discrete optical frequency shifter with associated control circuitry, and complicated signal processing circuitry. In cases where only notice of an event and its location is desired without severity information, a simpler and less expensive means for location is needed.

It is often desirable in intrusion detection security systems to know when authorized persons have entered an area for legitimate purposes and to record their identity. In systems providing surveillance of spaces on campuses or within buildings, it is regularly necessary for authorized persons to enter monitored areas without setting off reactions to alarms. Also, telecommunication or power cables which may be protected by such a system must often be accessed by authorized maintenance personnel of the operating company. In such cases it is desirable to properly identify and ignore the authorized person remotely without having to utilize another communication system, or shut the entire protective system down during access period. The prior art has not yet provided means to provide this type of identification. An economic method which utilizes the intrinsic capabilities of the distributed interferometer sensor is needed and has not been provided by the prior art.

An important requirement of intrusion detection systems in security and facility protection applications is the ability to regularly and conveniently proof test the integrity of the sensing loop by remote means. In a distributed Sagnac sensor, a break in the sensing fiber is of major concern. If the fiber were broken while in service, a momentary event would be recorded, and then the system would quickly return to a quiescent baseline state. Since no signal could propagate in either direction around the loop, there would be no signals other than background noise returning to the detector, and the output would look like that from a normal undisturbed system. What is required is means to remotely perturb the system in a way which positively proves that the sensing loop is intact and operating normally. Prior systems have not provided such a capability.

While interferometer based sensor systems have been developed with a number of refinements, prior systems have not been optimized for use as intrusion detection systems in security applications. What is desired and not yet available is a fiber optic sensing system which provides economic means for location of events, recognition and identification of authorized intrusions, and positive means for periodically and remotely proof testing the integrity of the sensing fiber loop.

SUMMARY OF THE INVENTION

The present invention is a fiber optic intrusion detection system comprising a closed loop of optical fiber in which two counterpropagating beams are caused to circulate in opposite directions. These beams are recombined and caused to fall on a detector in an interference pattern, and the amplitude of the resulting signal from the detector depends on the relative phase of the two counterpropagating signals after recombination. Time varying impacts upon the fiber loop, which may include direct pressures, acoustic waves, ultrasonic waves, and the like cause changes in the interfering phase relationships at the detector, thereby producing signals above the quiescent level. In the present invention, two such sensing fiber loops are contiguously overlaid such that a particular intrusion impacts both fibers at a common point. By measuring the difference in arrival time of the resulting optical disturbance from each sensing loop, the location of the point of common disturbance is determined.

Signal analysis and computing means are provided to compare the distinctive spectral, amplitude, and time patterns of disturbance signals to known prior patterns to identify the type and nature of detected disturbances. Further, since the system is sensitive to sonic and ultrasonic vibrations, circuits are provided to decode unique signals which are transmitted from coded sonic or ultrasonic sources carried by authorized personnel. In order to be acceptable for security and facility protection applications, the system is fitted with remote means to periodically disturb the optical sensing loop and positively prove its integrity and operability.

Therefore, in accordance with the description and drawings herein, advantages and objects of the present invention are:

a) to provide a distributed fiber optic sensing system which can detect mechanical, acoustic, or physical intrusions or contacts anywhere along its length over a range of a few meters to several tens of kilometers;

b) to provide a distributed fiber optic sensing system which can determine the location of such intrusion or contact along its length;

c) to provide a distributed fiber optic sensing system which can be remotely and automatically proof tested to verify its state of operability and readiness;

d) to provide a distributed fiber optic sensing system which can identify and appropriately ignore or report benign intruders such as authorized personnel of the operating agency;

e) to provide a distributed fiber optic sensing system which can by amplitude, spectral, and time series analysis, automatically determine the origin of a remote disturbance by comparison to the distinct patterns of known past events.

Other objects, advantages, and capabilities of the invention will become apparent from consideration of the complete description and associated drawings herein, which show only preferred embodiments.

DETAILED DESCRIPTION OF THE INVENTION

Figure 1:
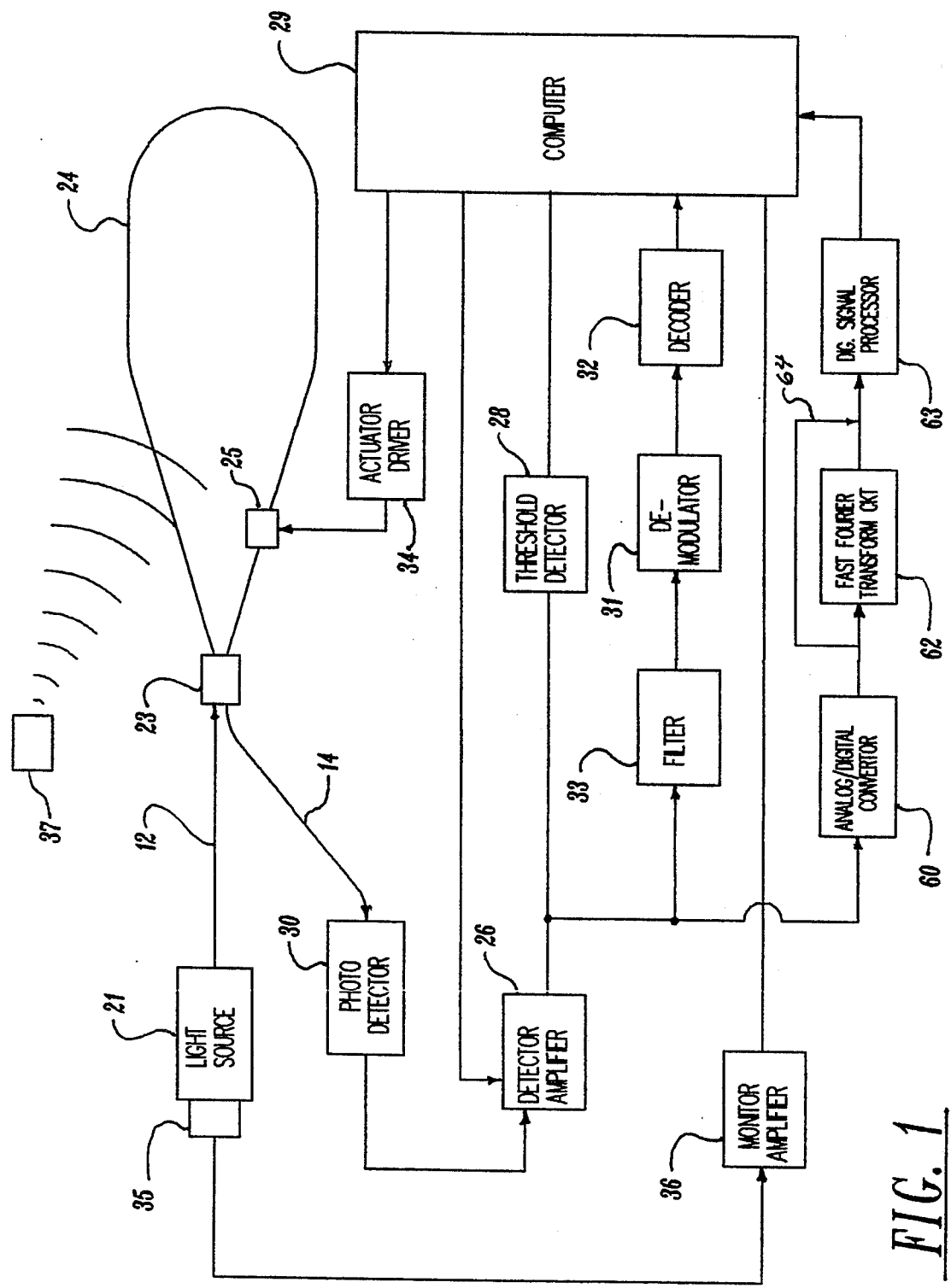
FIG. 1 is a functional schematic diagram of the distributed fiber optic sensing system of this invention showing the features of basic sensing, remote proof testing, identification of authorized intruders, and means for analysis of distinctive signal patterns.

Referring to FIG. 1, there is shown a simplified version of the fiber optic sensing system of the present invention. In this figure, only a single sensing loop 24 is shown, and the means for location of events along the loop 24 are not shown for the purpose of clarity. A light source 21 transmits a beam of light through a fiber 12 to a splitter 23. Splitter 23 divides the beam into two portions which are injected from its two ports into the sensing fiber loop 24. The two beams travel around the common path of sensing fiber loop 24 in opposite directions, and each returns to the splitter 23 through the port opposite to that whence it was launched. The two returning beams are recombined by splitter 23 and transmitted back through fiber 14 to a photoelectric detector 30. The two beams which have returned from traversing the sensing fiber loop 24 in opposite directions combine on the detector 30 to produce an interference pattern.

The resulting amplitude varying electrical signal from detector 30 is passed to a detector amplifier 26 and thence to a threshold detector 28. The output of threshold detector 28 is connected to a computer 29. The output of detector amplifier 26 is also connected to the input of a selective filter 33 and an analog to digital converter (hereinafter, A/t) converter) 60. The output of filter 33 is transmitted to a demodulator 31, and thence to a decoder 32. The decoded signal is then passed from decoder 32 to computer 29. The output of A/D converter 60 is connected to the input of a fast fourier transform circuit (hereinafter FFT circuit) 62 and also directly to an input of a digital signal processor (hereinafter DSP) 63. The output of DSP 63 is connected to computer 29.

The light source 21 is fitted with a monitor diode 35 whose output is connected to a monitor amplifier 36. Semiconductor lasers which may be used for light source 21 typically have such a monitoring diode internally fixed to the rear facet of the laser diode for the purpose of providing direct indication of laser output, and a means of laser output level control. It should be apparent to those skilled in the art that similar means can be arranged to directly monitor the output of other light sources such as light emitting diodes. The output of monitor amplifier 36 is connected to the computer 29.

Computer 29 is also connected to an actuator driver 34, and the output of actuator driver 34 is connected to an electromechanical actuator 25. Electromechanical actuator 25 is attached to a portion of the sensing optical fiber 24 in a manner which will allow mechanical stress or agitation of the sensing fiber in response to exciting current provided by actuator driver 34.

An acoustic transmitter 37 is provided in proximity to sensing fiber loop 24, and its output, which may be in the form of coded ultrasonic or sonic acoustic waves, are caused to impinge on sensing fiber loop 24. The coded signal may be analyzed to identify the bearer of the acoustic transmitter 37.

Light source 21, splitter 23, sensing fiber loop 24, and detector 30 operate in combination as a Sagnac interferometer. The output beam from light source 21 is split into two beams by splitter 23, which beams propagate in opposite directions through the common path of sensing fiber 24. These two counterpropagating beams are recombined by splitter 23, and their combination is conveyed by fiber 14 to photoelectric detector 30. The two counterpropagating beams interfere with each other within their common path, and their combined output falling on photodetector 30 is the resultant of their interference. In a stable condition the photodetector 30 will have a steady D.C. output which is a result of the quiescent degree of interference between the two counterpropagating beams. This output may have a steady value between zero and the sum of the peak levels of the two beams depending on whether their interference is destructive, constructive, or somewhere in between.

If any mechanical disturbance is made to sensing fiber 24 at a point within the region of the common path of the two counterpropagating beams, the optical properties of the fiber 24 is locally changed. This local change in optical properties will change the phase relationship of the two beams passing through that common region, and their resultant interference pattern will be changed. This will cause a change in the otherwise stable output of photodetector 30 in direct proportion to the degree of the mechanical disturbance to fiber 24. As a result of this behavior, it is found that the sensing fiber loop 24 is very sensitive to all sorts of events impinging on the loop including direct mechanical contact, local pressure, thermal effects, sonic and ultrasonic vibrations, and the like. When such an event occurs, the output of detector amplifier produces an electrical output, and if this output signal exceeds the level of a preselected threshold, threshold detector 28 provides an output to computer 29. Computer 29 is programmed to evaluate the event and signal an alarm when appropriate. Thus the system can be useful, for example, as a security alarm system for protecting the perimeter of enclosed areas such as buildings or government installations, or by distributing fiber 24 within a cable, as a monitor of intrusion or impact to telephone or power cables. Numerous other applications may be readily contemplated which will be recognized as falling within the scope of the present invention.

In preferred embodiments, the time varying electrical output of detector amplifier 26 is also utilized to provide important information as to the nature of the intrusion. It is important in all such installations to be able to identify authorized intrusions when they occur. Acoustic transmitter 37 is a small battery powered unit which may be carried on the person of an authorized individual. In the preferred arrangement, this transmitter emits an ultrasonic signal at a preselected frequency which is propagated through the surrounding medium to impinge on the distributed sensing fiber loop 24. The impinging acoustic waves on fiber 24 cause corresponding microscopic mechanical variations of the sensing fiber, thereby producing electrical output from detector amplifier 26 of frequency and amplitude corresponding to that of the transmitter 37. The acoustic signal of transmitter 37 is pulse width modulated by a unique code provided by its internal controller such as a microprocessor. A number of different transmitters can be coded with unique code patterns for use by a number of different authorized personnel. The pulse width modulated received signal is passed from the output of detector amplifier 26 to bandpass filter 33. This filter is arranged to pass only the selected carrier frequency of the acoustic transmitters 37, thereby rejecting background noise and substantially increasing the signal to noise ratio of the signal which is passed on to the demodulator 31. Demodulator 31 includes a saturation amplifier to remove amplitude variations of the 40 kHz carrier, and an envelope detector to remove the carrier and leave the width encoded pulse train. The width encoded pulse train is passed on to decoder 32 which transforms the width encoded information to a binary encoded digital signal. This binary signal is passed on to computer 29 which provides identification of the particular acoustic transmitter and its bearer. It is apparent that other frequencies, modulation methods, and coding schemes could be employed to accomplish the same purpose and fall within the scope of the present invention.

In preferred embodiments further important information is derived from the signal from detector amplifier 26 by analysis of the spectral and amplitude characteristics of the signal and comparison to known patterns. By experience with the present invention, it has become known that different intrusive events produce different signal patterns having distinctive characteristics, and analysis of these distinct patterns can lead to automatic identification of the source of the intrusion. For example, the signal from a vehicle passing over a buried segment of sensing fiber 24 will produce a signal having frequency and amplitude characteristics entirely distinct from those produced by vibrations of a civil structure to which a portion of sensing fiber 24 may be attached. The output of detector amplifier 26 is passed to A/D convertor 60 where it is sampled and converted to a digital equivalent signal. The digital representation of the interferometer signal is passed to FFT circuit 62 which performs a spectral analysis and provides spectral content information to the digital signal processor 63. Also, output of A/D convertor 60 is provided directly to DSP 63 by direct connection 64. DSP 63 in combination with computer 29 analyzes the amplitude, duration, and spectral content of the disturbance using look-up tables, pattern matching, artificial intelligence, and neural networking approaches. Disturbances which are similar to past events can thereby be identified, and the analysis and recording of new events can be utilized to develop background for identification of future events.

In security or facility monitoring applications it is necessary to regularly prove the operability of the system, and to be able to locate and repair faults expeditiously. In the present invention means are provided to remotely perturb the sensing fiber 24 and verify that an event can be detected and reported. This system check and verification process can be initiated in any one of several ways. In the preferred embodiment, the computer 29 initiates a system check routine upon either 1) a fixed period of time after each alarm event, 2) at regular time intervals, or 3) on demand from the system operator. Upon initiation of system check routine, a signal is sent from computer 29 to actuator driver 34. Actuator driver 34 energizes the electromechanical actuator 25 which is affixed to sensing fiber. This electromechanical actuator may be in the form of a short coil of the sensing fiber bonded to the surface of a piezoelectric element which is activated by the actuator driver 34, or it may be an electromagnetic actuator which impacts the fiber 24 when energized by the actuator driver 34. When the actuator 25 is activated, the presence of a corresponding output from the threshold detector will serve to confirm that the sensing fiber loop 24 is intact and operating.

If the sensing fiber loop 24 is broken, there will be no signal when the disturber is activated, and this will confirm a fault. At this point the failure to receive a corresponding signal can be due to an optical fault in one of the fibers 12, 14, or 24; a failure of light source 21; a failure of photodetector 30; or failure of detector amplifier 26. To aid in segmenting the system and isolation of the fault, computer 29 will check to verify output from monitor detector 35 by way of monitor amplifier 36. If there is no output from monitor amplifier 36, this directs repair effort to the light source 21. If output of source 21 is confirmed, then the computer 29 provides a test pulse into detector amplifier 26 which provides a minimum discernable signal to threshold detector 28. If a corresponding alarm signal fails to arrive at computer 29, then failure of detector amplifier 26 and/or threshold amplifier 28 are confirmed, and these should be replaced. If an alarm signal is received, then one or more of the optical components 12, 14, 30, 23, or 24 have failed.

Prior to dispatching personnel to locate faults along sensing fiber 24 in the field, a short fiber jumper, known to be good, is connected between the output ports of splitter 23 in substitution for sensing fiber 24. If alarm signals are then received upon manipulation of this substitute jumper cable, then failure of the distributed sensing fiber loop 24 is confirmed and repair personnel can be dispatched to the field. If no alarm signals are received with the substitute jumper attached, then the remaining optical components 12, 14, 23, and 30 must be investigated. From this description and the associated drawing it will be apparent that various means and devices can be arranged for remote automatic or manual testing of the system of the present invention to provide efficient and timely verification of operation, or identification and location of faults, and remain within the scope of the present invention.

Figure 2:
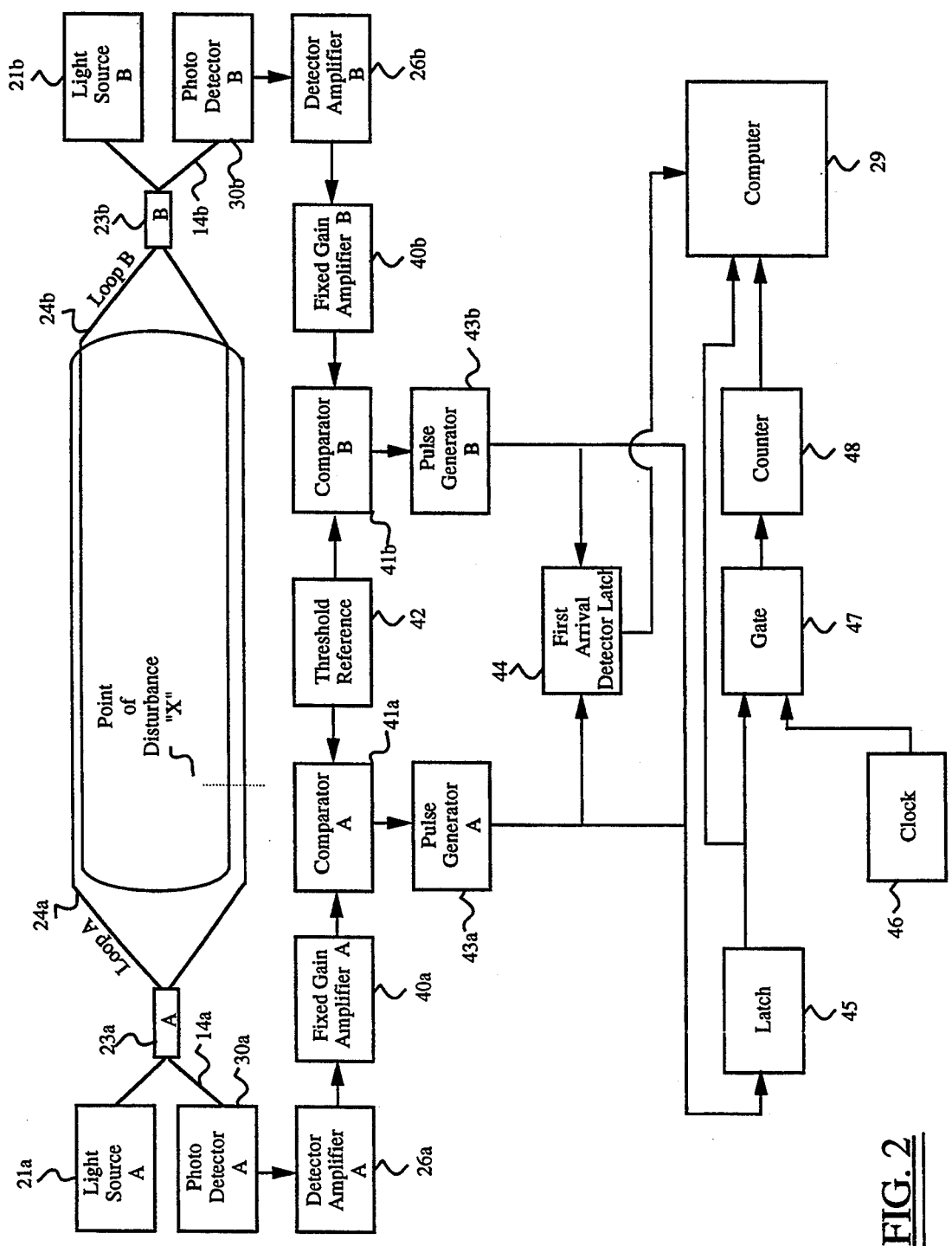
FIG. 2 is a functional schematic diagram showing the means for location of intrusion events along the distributed fiber sensors.

Referring now to FIG. 2, there is shown a schematic diagram of the present invention showing the additional elements required to provide means for location of the point of a contact or intrusion on the sensing fiber loop. These elements are not shown in FIG I and the description above for the sake of clarity. In the preferred embodiment as depicted in FIG. 2, two overlapping sensing fiber loops operating as Sagnac interferometers are employed. The sensing fiber loops 24a and 24b are deployed contiguously over the same path to be protected. In the preferred embodiment these overlapping sensing fibers are incorporated into a common duplex cable in so far as possible so that a mechanical impact on the fiber of loop 24a will have virtually the same effect on fiber 24b at essentially the same point, i.e. at the common point of disturbance "X". In the sensing system on the left side of FIG. 2, light source 21a, splitter 23a, sensing fiber loop 24a, and detector 30a operate in combination as a Sagnac interferometer. The output beam from light source 21a is split in to two beams by splitter 23a, which beams propagate in opposite directions through the common path of sensing fiber 24a. These two counterpropagating beams are recombined by splitter 23a, and their combination is conveyed by fiber 14a to photodetector 30a. The two counterpropagating beams interfere with each other within their common path, and their combined output falling on photodetector 30a is the resultant of their interference. In a stable condition the photodetector 30a will have a steady D.C. output which is a result of the quiescent degree of interference between the two counterpropagating beams. This output may have a value between zero and twice the sum of the peak levels of the two beams depending on whether their interference is destructive, constructive, or somewhere in between. If any mechanical disturbance is made to sensing fiber 24a at a point within the region of the common path of the two counterpropagating beams, the optical properties of the fiber 24a is locally changed. This local change in optical properties will change the phase relationship of the two beams passing through that common region, and their resultant interference pattern will be changed. This will cause a change in the otherwise stable output of photodetector 30a in direct proportion to the degree of the mechanical disturbance to fiber 24a.

The sensing system on the right side of FIG. 2 operates in the same way with light source 21b, splitter 23b, sensing fiber loop 24b, and detector 30b operating in combination as a Sagnac interferometer. The output beam from light source 21b is split in to two beams by splitter 23b, which beams propagate in opposite directions through the common path of sensing fiber 24b. These two counterpropagating beams are recombined by splitter 23b, and their combination is conveyed by fiber 14b to photodetector 30b. The two counterpropagating beams interfere with each other within their common path, and their combined output falling on photodector 30b is the resultant of their interference.

Thus it can be seen that a common disturbance which impinges on both fibers 24a and 24b at, for example, point X will, by the operation of the two overlapping Sagnac interferometer systems, produce similar outputs from photodetectors 30a and 30b. In fact these outputs from detectors 30a and 30b are virtually identical except that the leading edge of the electrical output from detector 30b is delayed relative to the arrival time of the disturbance output from detector 30a by an amount which is equal to the difference between the time of propagation from disturbance point X to detector 30a and the time of propagation from point X to detector 30b.

Figure 3:
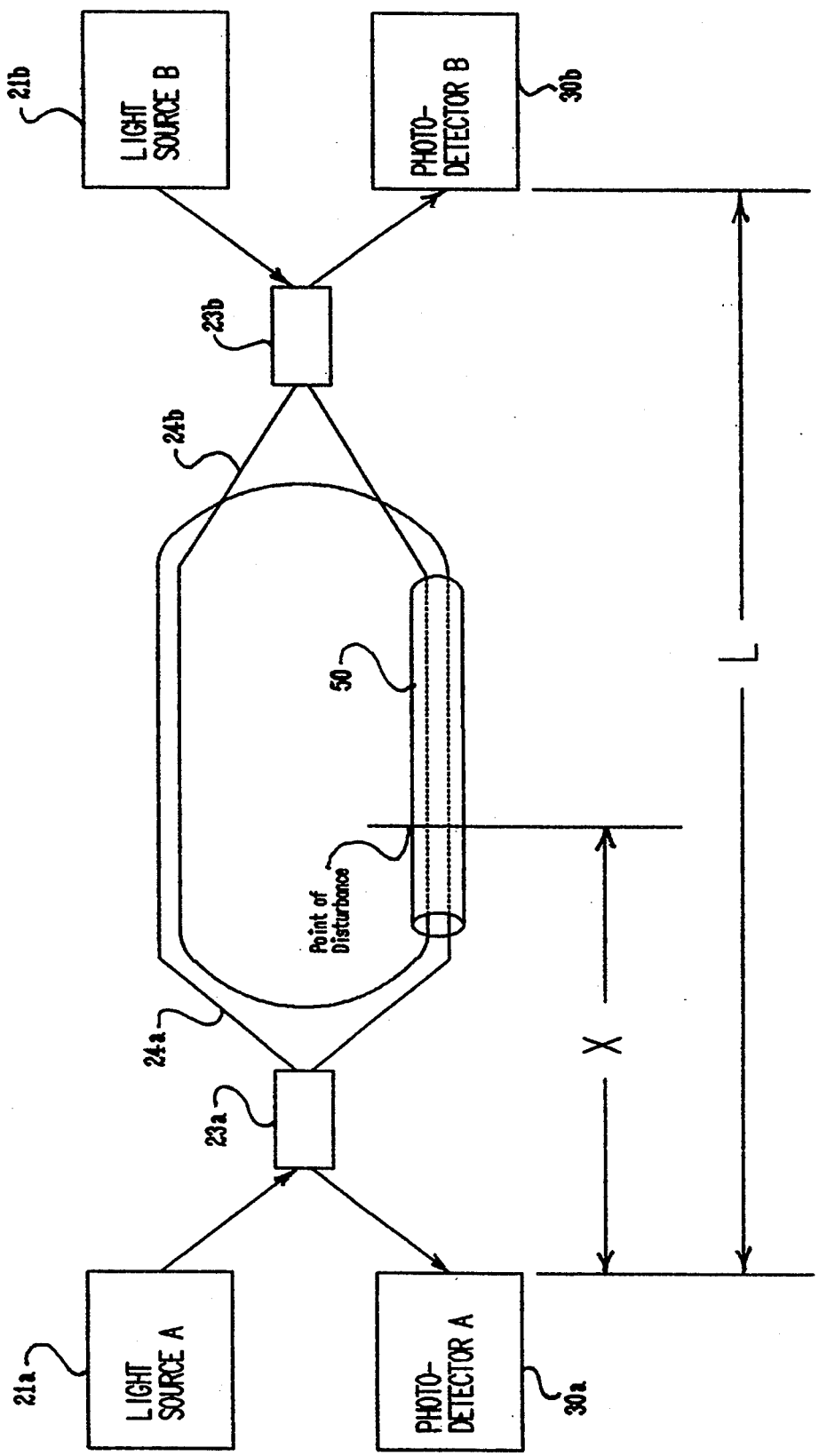
FIG. 3 is a diagram showing the geometry and parameters used in calculating the location of intrusion events along the distributed fiber sensors.

The difference in the time of arrival of the leading edge of a common disturbance at detectors 30a and 30b is measured and analyzed to compute the location of the point of disturbance X along the common sensing fiber loop, 24a and 24b. Referring to FIG. 3, there is shown a schematic of overlapping sensing fiber loops with a common disturbance impinging on a portion of the loop at point X. The common portion of the loop is contained within a duplex cable structure 50 such that a single impact at point X will have the same effect simultaneously on fibers 24a and 24b. In FIG. 3 the overall known length of the deployed array is L. The distance from end A to the point of disturbance is X, and the corresponding time of travel of the disturbance from the point of disturbance to the detector 30a is $T_a$. Similarly $T_b$ is the corresponding time of travel of the disturbance from the point of disturbance to the detector 30b. From FIG. 3 it can be seen that if V is the velocity of propagation of light in fibers 24a and 24b, then:

$$L - 2X = V(T_b - T_a) \qquad 1)$$

or $$2X = L - V(T_b - T_a) \qquad 2)$$

so that $$X = \frac{L - V(T_b - T_a)}{2} \qquad 3)$$

i.e.

$$X = \frac{L - V\Delta T}{2} \qquad 4)$$

where $\Delta T$ is the amount of time by which the leading edge of the disturbance travelling to the right in fiber 24b is delayed in reaching detector 30b after the corresponding leading edge of the disturbance travelling to the left in fiber 24a reaches detector 30a. The additional elements in FIG. 2 are employed to measure this time difference and derive a position from that time difference according to Equation 4) hereinabove.

Referring again to FIG. 2, the output of photo detector 30a is connected to a detector amplifier 26a, the output of which feeds through a fixed gain amplifier 40a to a comparator 41a. A threshold reference 42 supplies a common reference voltage to both comparators 41a and 41b. The output of comparator 41a is connected to a pulse generator 43a, whose output is connected to a latch 45. The system on the right side of FIG. 2 is arranged in like fashion such that the output of photodetector 30b is connected to a detector amplifier 26b whose output is connected through a fixed gain amplifier 40b to a comparator 41b. As stated above, the threshold reference 42 feeds the common reference voltage to comparator 41b. The output of comparator 41b is connected to a pulse generator 43b, whose output is also connected to the common input of latch 45. The outputs of pulse generators 43a and 43b are also connected to alternate inputs of a first arrival detector latch 44, whose output is connected to computer 29. The output of latch 45 is connected to a gate 47, and also directly to computer 29. Gate 47 is also supplied with a clock signal from a clock 46, and its output is connected to a counter 48. The output of counter 48 is connected to the computer 29.

Prior to normal operation, system sensitivity is balanced by adjusting fixed gain amplifiers 40a and 40b and threshold reference 42 such that as intensity of common impact at point X is increased from a minimum value, both pulse generators 43a and 43b will begin to be triggered at the same level of common impact.

In normal operation, when a common impact occurs at point X, there will first be an output of fixed gain amplifier 40a to comparator 41a. When the leading edge of this electrical response exceeds the threshold reference voltage from reference 42, the output of comparator 43a will trigger pulse generator 43a and cause it to provide a very narrow pulse to latch 45. This first pulse from generator 43a simultaneously sets both first arrival detector latch 44 and latch 45. First arrival detector latch 44 provides the sign bit to computer 29, i.e. positive if a pulse first arrives from generator 43a, and negative if the first pulse is from generator 43b. Latch 45 enables gate 47 and signals computer 29 to retrieve the sign bit. When gate 47 is thus opened, clock pulses from clock 46 are passed to counter 48 and the counter 48 starts accumulating. After the elapsed time $\Delta T$ as defined in Equation 4) hereinabove, the disturbance reaches detector 30b and a corresponding pulse is produced by pulse generator 43b. When this second pulse arrives from pulse generator 43b, latch 45 resets and the trailing edge of its output signal closes gate 47 and signals computer 29 to retrieve the count from counter 48. This count is a representation of $\Delta T$ of Equation 4) and its sign is provided by the action of first arrival detector 44. Distance X to the point of common impact is determined from Equation 4). If $\Delta T$ is zero, then $X=L/2$. If $\Delta T$ is positive, then $0 \leq X \leq L/2$, and if $\Delta T$ is negative, then $L/2 \leq X \leq L$.

From examination of FIG. 2 and the above description, it is apparent that there can be no bias in delay of pulses from side B relative to side A caused by differences in electrical path length from detector 30b to latch 45 compared to the electrical distance from detector 30a to latch 45. This is most conveniently arranged by co-locating the electronics of subsystems A and B. Thereby the differentials in electrical propagation times from detectors 30a and 30b to latch 45 will be insignificant relative to the much longer propagation times along distributed sensing fibers 24a and 24b. However, in many cases it may be desirable to locate the bulk of the equipment at one end. In another preferred embodiment this may be accomplished according to FIG. 4. This embodiment is identical to that of FIG. 2 except that a transmission link comprising a transmitter 83, a receiver 82, and a pulse regenerator 85 are added between pulse generator 43b and latch 45, and a delay timer 81 is added between pulse generator 43a and latch 45. Link 84 is also provided between the computer 29 and timer 81, and two separate threshold references 42a and 42b feeding comparators 41a and 41b respectively are provided. Here it can be seen that the communications path between transmitter 83 and receiver 82 may be arbitrarily long, and therefore system ends A and B may be separated by any desired distance. It is only necessary that the propagation time between transmitter 83 and receiver 82 be fixed and known in value.

Figure 4:
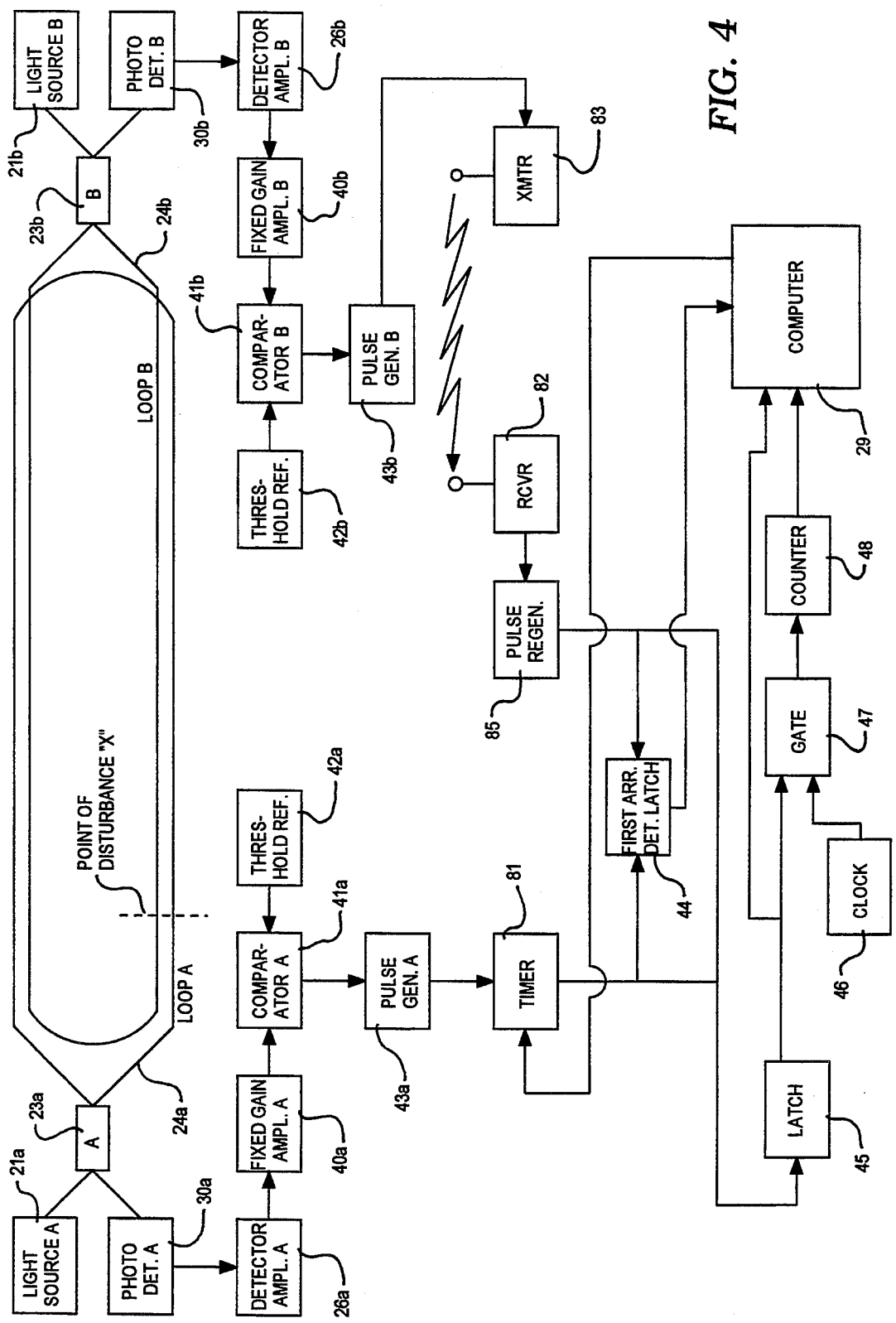
FIG. 4 is a diagram showing means for location of intrusion events with the additional means of an extended transmission link for remote location of far-end optics and electronics.

The operation of the embodiment shown in FIG. 4 is the same as that shown in FIG. 2 with the following exceptions. Prior to normal operation, system sensitivity must again be balanced by adjusting threshold references 42a and 42b along with fixed gain amplifiers 40a and 40b as described above. For a common impact at point X, when a first pulse is generated by pulse generator 43a, timer 81 is programmed via line 84 by computer 29 to delay the output from pulse generator 43a by an amount of time equal to the known propagation time from transmitter 83 to receiver 82. When this known delay time has elapsed, as before, first arrival latch 44 and latch 45 will be set by the pulse released from timer 81. The sign will be passed to the computer, and the counter 48 will begin to accumulate clock pulses. When the corresponding disturbance reaches detector 30b from the common disturbance at point X, a second pulse will be generated by pulse generator 43b and sent by transmitter 83 to receiver 82. Note that this second pulse will experience exactly the same known amount of delay by which timer 81 delayed the output of the first pulse from pulse generator 43a. Therefore, this known delay of the communications link is eliminated from the count accumulated by counter 48. This received pulse may be somewhat distorted by transit over the communications path, and so it is regenerated to appropriate level and sharpness by pulse regenerator 85. This second pulse then resets latch 45 as before, which action then closes gate 47, stops the accumulation of counter 48, and signals computer 29 to retrieve the count from counter 48. This count is a representation of ΔT of Equation 4) and its sign is provided by the action of first arrival detector 44. Distance X to the point of common impact is determined from Equation 4).

Various transmission media can be employed for the communications link from pulse generator 43b to regenerator 85. This may be a radio link as indicated in FIG. 4, or it could be a metallic or fiber optic cable link. In fact, by utilizing, for example, wave division multiplexing techniques, the communications link could be established from end B to end A over a segment of one of the sensing fibers 24a or 24b.

The above description and disclosure of the invention are illustrative of the preferred embodiments. However, it will be apparent to those skilled in the art that various arrangements and substitutions of components may be made which embody the principles of the invention and fall within its scope and spirit.

What is claimed is:

1. A distributed fiber optic sensor comprising:
   a) a first light source for injecting a first beam of light into a fiber;
   b) a first optical splitter whose first port is connected to said first light source by an optical fiber, the splitter being effective to divide the first beam into a second and third beam, which second and third beams exit from the second and third ports of said splitter;
   c) a first loop of optical fiber having its opposite ends connected to said second and third ports of said first optical splitter, thereby receiving said second and third beams which propagate through said first loop of optical fiber in opposite directions, and which returns said beams to the splitter to be recombined, a portion of the recombined beam exiting from the fourth port of the splitter;
   d) a first photoelectric detector connected by a fiber to the fourth port of said first optical splitter, thereby receiving said portion of said recombined beam;
   e) a first electronic circuit connected to said first photoelectric detector for amplifying, analyzing, and decoding the electrical output of said first photoelectric detector resulting from changes in the interference intensity of said recombined beam caused by disturbances to said first loop of optical fiber; and
   f) mechanical disturbing means, affixed to the fiber of said first loop of optical fiber, for indicating system operability by deliberately agitating said first loop of optical fiber under control from a central system control station, which agitation causes a positive system output if said first optical fiber is unbroken, and causes no response if said first loop of optical fiber is broken.

2. The distributed fiber optic sensor recited in claim 1 wherein said mechanical disturbing means is a piezoelectric element having a portion of said first loop of optical fiber affixed to its surface such that application of an electrical voltage to said piezoelectric element will be effective to change the optical properties of said portion of the fiber sufficient to cause a disturbance in the output of said photoelectric detector.

3. The distributed fiber optic sensor recited in claim 1 wherein said mechanical disturbing means is an electromechanical activator having a current coil surrounding an armature which is effective to impress said armature on said loop of optical fiber when an electrical current is passed through said coil sufficient to cause a disturbance in the output of said photoelectric detector.

4. A distributed fiber optic sensor comprising:
   a) a first light source for injecting a first beam of light into a fiber;
   b) a first optical splitter whose first port is connected to said first light source by an optical fiber, the splitter being effective to divide the first beam into a second and third beam, which second and third beams exit from the second and third ports of said splitter;
   c) a first loop of optical fiber having its opposite ends connected to said second and third ports of said first optical splitter, thereby receiving said second and third beams which propagate through said first loop of optical fiber in opposite directions, and which returns said beams to the splitter to be recombined, a portion of the recombined beam exiting from the fourth port of the splitter;
   d) a first photoelectric detector connected by a fiber to the fourth port of said first optical splitter, thereby receiving said portion of said recombined beam;
   e) a first electronic circuit connected to said first photoelectric detector for amplifying, analyzing, and decoding the electrical output of said first photoelectric detector resulting from changes in the interference intensity of said recombined beam caused by disturbances to said first loop of optical fiber;
   f) sound emitting means, carried on the person of an authorized individual, for transmitting a unique coded signal which is effective to disturb said first loop of optical fiber sufficient to be detected and demodulated by said first electronic circuit; and
   g) decoding means for demodulating and interpreting said unique coded signal to identify the authorized individual bearing said sound emitting means.

5. The distributed fiber optic sensor recited in claim 4 wherein said sound emitting means operates within the audible frequency band.

6. The distributed fiber optic sensor recited in claim 4 wherein said sound emitting means operates within the ultrasonic range.

7. A distributed fiber optic sensor comprising:
   a) a first light source for injecting a first beam of light into a fiber;
   b) a first optical splitter whose first port is connected to said first light source by an optical fiber, the splitter being effective to divide the first beam into a second and third beam, which second and third beams exit from the second and third ports of said splitter;
   c) a first loop of optical fiber having its opposite ends connected to said second and third ports of said first optical splitter, thereby receiving said second and third beams which propagate through said first loop of optical fiber in opposite directions, and which returns said beams to the splitter to be recombined, a portion of the recombined beam exiting from the fourth port of the splitter;
d) a first photoelectric detector connected by a fiber to the fourth port of said first optical splitter, thereby receiving said portion of said recombined beam;
e) a first electronic circuit connected to said first photoelectric detector for amplifying, analyzing, and decoding the electrical output of said first photoelectric detector resulting from changes in the interference intensity of said recombined beam caused by disturbances to said first loop of optical fiber;
f) spectral analysis means for determining the spectral content of said electrical output in real time as said electrical output occurs;
g) signal processing and computing means for identifying origin of said electrical output by comparisons of amplitude and spectral content to patterns of known past events; and
h) computer self-programming means for automatically refining and updating stored repertoire of known patterns by analysis of current event signals.

8. A distributed fiber optic sensor comprising:
a) a first light source for injecting a first beam of light into a fiber;
b) a first optical splitter whose first port is connected to said first light source by an optical fiber, the splitter being effective to divide the first beam into a second and third beam, which second and third beams exit from the second and third ports of said splitter;
c) a first loop of optical fiber having its opposite ends connected to said second and third ports of said first optical splitter, thereby receiving said second and third beams which propagate through said first loop of optical fiber in opposite directions, and which returns said beams to the splitter to be recombined, a portion of the recombined beam exiting from the fourth port of the splitter;
d) a first photoelectric detector connected by a fiber to the fourth port of said first optical splitter, thereby receiving said portion of said recombined beam;
e) a first electronic circuit connected to said first photoelectric detector for amplifying, analyzing, and decoding the electrical output of said first photoelectric detector resulting from changes in the interference intensity of said recombined beam caused by disturbances to said first loop of optical fiber;
f) a second light source for injecting a fourth beam of light into a fiber;
g) a second optical splitter whose first port is connected to said second light source by an optical fiber, the splitter being effective to divide the fourth beam into a fifth and sixth beam, which fifth and sixth beams exit from the second and third ports of the splitter;
h) a second loop of optical fiber overlaid on and contiguous to said first loop of optical fiber, having its opposite ends connected to said second and third ports of said second optical splitter, thereby receiving said fifth and sixth beams which propagate through said second loop of optical fiber in opposite directions, and which returns said beams to the splitter to be recombined, a portion of the recombined beam exiting from the fourth port of the splitter;
i) a second photoelectric detector connected by a fiber to the fourth port of said second optical splitter, thereby receiving said portion of said recombined beams;
j) a second electronic circuit connected to said second photoelectric detector for amplifying, analyzing, and decoding the electrical output of said second photoelectric detector resulting from changes in the interference intensity of said recombined beam caused by disturbances to said second loop of optical fiber;
k) a first triggering means connected to said first photoelectric detector for producing a timing pulse when the leading edge of a signal from said first loop of optical fiber caused by a common disturbance exceeds a pre-set threshold value;
l) a second triggering means connected to said second photoelectric detector for producing a timing pulse when the leading edge of a signal from said second loop of optical fiber caused by said common disturbance impact exceeds a pre-set threshold value; said first optical splitter, and associated first photoelectric detector, first electronic circuit and first triggering means being located at a distance apart around the overlaid portions of the first and second optical fiber loops from said second optical splitter, and associated second photoelectric detector, second electronic circuit, and second triggering means such that a measurable difference in elapsed time will occur between the arrival of the leading edge of a signal from said first loop of optical fiber at said first triggering means and the arrival of the leading edge of a corresponding signal from said second loop of optical fiber at said second triggering means caused by a common disturbance of both fiber loops at a common point.
m) time measuring means for measuring the elapsed time between arrival of the timing pulse from said first triggering means and the timing pulse from said second triggering means; and
n) computing means connected to said time measuring means for calculating position of said common disturbance along said first and second loops of optical fiber based on said elapsed time.

9. The distributed fiber optic sensor recited in claim 8 further comprising:
a) remote transmission means providing the link between said second triggering means and said time measuring means; and
b) time delay means for delaying pulse from said first triggering means to said time measuring means by an amount equal to the propagation time over said remote transmission means.

10. The distributed fiber optic sensor recited in claim 8 further comprising:
a) remote transmission means providing the link between said first triggering means and said time measuring means; and
b) time delay means for delaying pulse from said second triggering means to said time measuring means by an amount equal to the propagation time over said remote transmission means.

* * * * *